(12) United States Patent
Cuthbert et al.

(10) Patent No.: US 9,032,073 B1
(45) Date of Patent: May 12, 2015

(54) OPERATIONAL STATUS OF NETWORK NODES

(71) Applicant: Amazon Technologies, Inc., Reno, NV (US)

(72) Inventors: David A. Cuthbert, Bainbridge Island, WA (US); Sergei V. Shinkarev, Seattle, WA (US); Jeffrey J. Fielding, Seattle, WA (US); Ting-You Wang, Kent, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/146,935

(22) Filed: Jan. 3, 2014

Related U.S. Application Data (63) Continuation of application No. 12/719,135, filed on Mar. 8, 2010, now Pat. No. 8,635,319.

(51) Int. Cl.
*G06F 15/173* (2006.01)
*G06F 11/30* (2006.01)
*H04L 12/26* (2006.01)

(52) U.S. Cl.
CPC ........ *G06F 11/3006* (2013.01); *H04L 43/0805* (2013.01); *H04L 43/14* (2013.01); *H04L 43/0811* (2013.01); *H04L 43/0817* (2013.01)

(58) Field of Classification Search
CPC . H04L 43/0805; H04L 43/14; H04L 43/0811; H04L 43/0817; G06F 11/3006
See application file for complete search history.

(56) References Cited

U.S. PATENT DOCUMENTS

| | | | | |
|---|---|---|---|---|
| 5,049,873 A * | 9/1991 | Robins et al. | | 370/254 |
| 5,634,009 A * | 5/1997 | Iddon et al. | | 709/223 |
| 6,061,725 A * | 5/2000 | Schwaller et al. | | 709/224 |
| 6,408,335 B1 * | 6/2002 | Schwaller et al. | | 709/224 |
| 6,542,738 B2 * | 4/2003 | Keenan et al. | | 455/424 |
| 7,082,463 B1 * | 7/2006 | Bradley et al. | | 709/223 |
| 7,099,797 B1 * | 8/2006 | Richard | | 702/182 |
| 7,467,192 B1 * | 12/2008 | Lemler et al. | | 709/223 |
| 7,684,392 B2 * | 3/2010 | Saito et al. | | 370/389 |
| 8,010,643 B2 * | 8/2011 | Gray et al. | | 709/223 |
| 2006/0209760 A1 * | 9/2006 | Saito et al. | | 370/331 |
| 2010/0097991 A1 * | 4/2010 | Morimoto | | 370/328 |
| 2011/0188400 A1 * | 8/2011 | Kitawaki et al. | | 370/252 |

* cited by examiner

*Primary Examiner* — Lynn Feild
*Assistant Examiner* — Michael A Chambers
(74) *Attorney, Agent, or Firm* — Thomas | Horstemeyer, LLP (57) ABSTRACT

Disclosed are various embodiments for network monitoring. A processor circuit having a processor and a memory is employed. A listing of components of a network is stored in the memory, the listing including a plurality of endpoints and a plurality of nodes. One of the endpoints includes the processor circuit. A monitoring application is stored in the memory and executable by the processor. The monitoring application is configured to maintain in the memory an indication of an operational status of each of the nodes derived from a plurality of status requests transmitted between respective pairs of the endpoints.

20 Claims, 6 Drawing Sheets

FIG. 1

Communication Pathway Table 123

| Endpoint Pair | Sequence of Nodes | | | | | | |
|---|---|---|---|---|---|---|---|
| A-B | 27 | 31 | 65 | 04 | 45 | 56 | o o o |
| A-C | 34 | 56 | 67 | 04 | 77 | 66 | o o o |
| A-D | 12 | 43 | 42 | 04 | 67 | 56 | o o o |
| A-E | 23 | 31 | 33 | 55 | 67 | 56 | o o o |
| A-F | 11 | 33 | 54 | 65 | 76 | 75 | o o o |
| A-G | 27 | 22 | 75 | 04 | 46 | 56 | o o o |
| G-F | 56 | 32 | 22 | 34 | 31 | 27 | o o o |

FIG. 2

Status Request Results Log 126

| Pair | Timestamp | Result |
|---|---|---|
| D-B | 03:22 | 1 |
| A-G | 03:36 | 0 |
| E-C | 03:57 | 1 |
| G-A | 04:05 | 1 |

FIG. 3

| Status Request 113 | | |
|---|---|---|
| Pair | Timestamp | Result |
| D-B | 03:22 | 1 |
| A-G | 03:36 | -1 |
| E-C | 03:57 | 1 |
| G-A | 04:05 | 1 |
| ⋮ | ⋮ | ⋮ |
| D-C | 04:42 | 1 |

FIG. 4

| Node Status Table 131 | |
|---|---|
| Node Identifier 132 | |
| Node Status Score: 16 | |
| Value | Timestamp |
| 1 | 03:22 |
| 1 | 03:34 |
| 1 | 03:56 |
| -1 | 04:04 |
| ⋮ | ⋮ |
| 1 | 04:34 |

OPERATIONAL STATUS OF NETWORK NODES

CROSS REFERENCE TO RELATED APPLICATIONS

This application is a continuation of U.S. application Ser. No. 12/719,135 entitled "Operational Status of Network Nodes," filed Mar. 8, 2010, now issued as U.S. Pat. No. 8,635,319, which is incorporated herein by reference in its entirety.

BACKGROUND

Some networks facilitate communication between devices through various nodes. From time to time, a failure of a portion of the network such as a failure in a node can result in the loss of data. The operators of the devices that communicate via the network may not actually control the network. As a consequence, they may not be aware of whether a node or other portion of the network is faulty. Also, they are not able to inform network operators where a problem may exist in the network if a failure occurs.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
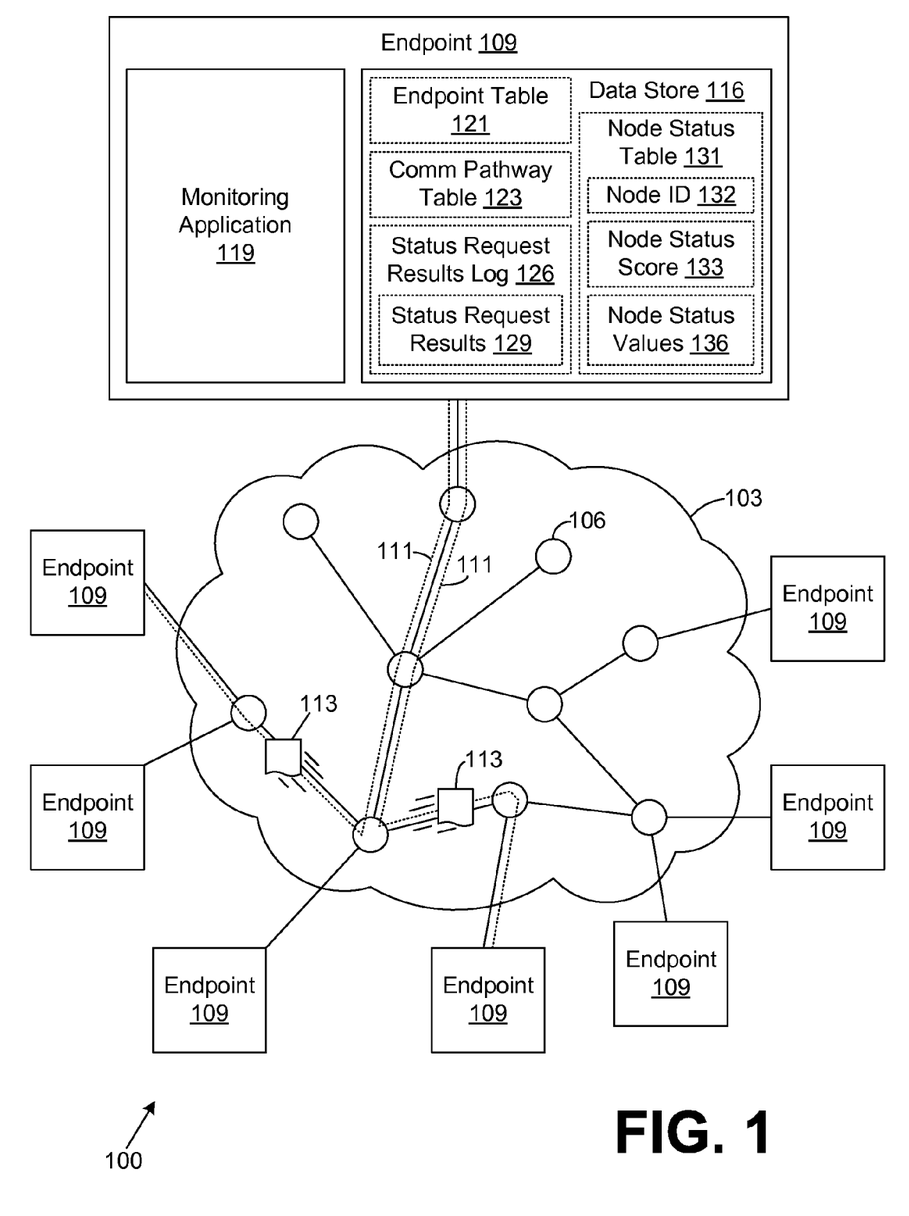
FIG. 1 is a drawing of a networked environment according to an embodiment of the present disclosure.

With reference to FIG. 1, shown is a networked environment 100 that facilitates the following discussion relating to the monitoring of a network 103 having several different nodes 106. Specifically, endpoints 109 are coupled to the network 103. The operational status of each of the nodes 106 in the network 103 is derived from a plurality of status requests 113 transmitted between respective pairs of the endpoints 109 as will be described. In the following discussion, first a description of the physical nature of the networked environment 100 is provided, followed by a description of the operation of the same. A more detailed discussion of various aspects is provided with respect to later figures.

The networked environment 100 depicted in FIG. 1 includes various computing devices such as, for example, a plurality of nodes 106 in the network 103 and a plurality of endpoints 109. Each of the endpoints 109 may comprise, for example, a computing device such as one or more servers and/or other computing devices that are coupled to the network 103. The network 103 may comprise, for example, the Internet, intranets, extranets, wide area networks (WANs), local area networks (LANs), wired networks, wireless networks, packet switched networks, or other suitable networks, etc., or any combination of two or more such networks.

Each of the endpoints 109 comprises one example of a computing device that may be employed to execute various components as described herein. Such endpoints 109 may comprise one or more servers or other computing devices as will be described. Each of such servers may comprise, for example, a server computer or like system having a processor circuit, and may represent multiple servers arranged, for example, in one or more server banks or other arrangements. Such servers may be located in a single installation or may be dispersed among many different geographical locations. To this end, such servers may be viewed as a server "cloud" that represents the computing capacity of multiple servers, etc.

Each individual node 106 in the network 103 may comprise any one of many different kinds of devices or facilities. For example, where at least a portion of the network 103 comprises a packet switched network, a given node 106 may comprise a digital switch. The network 103 may also include a plurality of networks that are coupled together. Thus, each node 106 may comprise a network of subordinate nodes, where part of such node 106 may not be operational due to a failure of one or more of such subordinate nodes. Also, each of the nodes 106 may comprise a facility such as a data processing facility, or a data communication facility that includes many different switches or other devices. In addition, each of the nodes 106 may be made up of other types of devices as can be appreciated, where at least some of the devices facilitate the generation of communication pathways 111 between respective endpoints 109. Thus, the nodes 106 may comprise individual devices, facilities, or other portions of a network 103 through which data is communicated as will be described. A node 106 may be defined as devices that are contained within a predefined boundary drawn by those who wish to monitor the operation of the various components of the network 103. Such boundaries may be drawn depending upon the level of detail of status information desired for the network 103.

Various applications and/or systems are executed in each respective one of the endpoints 109 according to various embodiments. Also, various data may be stored in data store 116 that are associated with, or are otherwise accessible to, the endpoints 109. The data stored in such data stores 116, for example, may be associated with the operation of the various systems, applications, and/or processes described below. According to one embodiment, among the systems and applications executed in each of the endpoints 109 is, for example, a monitoring application 119. The monitoring application 119 is implemented in each endpoint 109 to track an operational status of the nodes 106 in the network 103 as will be described.

The functionality of the monitoring application 119 may be considered secondary to other applications implemented on the endpoints 109 such as electronic commerce systems and other applications. For example, an electronic commerce system may facilitate the operation of one or more network sites such as web sites on the Internet that facilitate electronic commerce. To this end, the electronic commerce system may comprise many different applications, components, and/or systems implemented on a plurality of computing devices such as the endpoints 109 that are located at one site, or are distributed among geographically diverse sites as can be appreciated. However, for purposes of this discussion, such other applications (i.e., an electronic commerce system) are not discussed in detail.

Various data is stored in the data store 116 such as, for example, a listing of the endpoints 109 in an endpoint table 121, and a listing of the communication pathways 111 between respective pairs of the endpoints 109 in a communication pathway table 123. Associated with each of the communication pathways 111 is a sequence of the nodes 106 as will be described. Also stored in the data store 116 is a status request results log 126 in which are stored a plurality of status request results 129. The status request results 129 may be generated by the operation of the monitoring application 119 in sending status requests 113 to other endpoints 109. Alternatively, status request results 129 may be obtained from status requests 113 received from other endpoints 109 as will be described.

In addition, associated with each of the nodes 106 is a node status table 131 stored in the data store 116. Each node status table 131 includes a node identifier 132, a node status score 133, and a plurality of node status values 136 for a respective one of the nodes 106. The node identifier 132 identifies the node 106 that is associated with the node status table 131. The node status score 133 is calculated from the node status values 136 as will be described.

Next, a discussion of the operation of the various components in the networked environment 100 is provided. To begin, the network 103 is used to facilitate communication between various endpoints 109. In some embodiments, the network 103 may provide multiple different communication pathways 111 between a respective pair of endpoints 109. Alternatively, it may also be the case that the network 103 is operated in such a manner that data transmitted between respective pairs of endpoints 109 follow fixed communication pathways 111 made up of fixed sequences of nodes 106. In the case of the latter, if a given one of the nodes 106 is malfunctioning such that the communication pathway 111 is interrupted or unavailable when data is transmitted, then the transmitted data may be lost.

According to one embodiment, the monitoring application 119 is executed in each individual one of the endpoints 109 in order to generate a node status score 133 for each of the nodes 106 in the network 103. Each node status score 133 indicates an operational status or operational health of a respective node 106. According to one embodiment, the node status score 133 is derived from a plurality of status requests 113 that are transmitted between respective pairs of the endpoints 109.

To explain further, the monitoring application 119 in each of the endpoints 109 is configured to select other ones of the endpoints 109 from the endpoint table 121 to which status requests 113 are to be sent. The selection of an endpoint 109 to which to send a status request 113 may be random or by some other approach. For example, the endpoints 109 may be selected according to a sequence that is repeated over time.

Then, the monitoring application 119 is configured to generate and transmit a status request 113 to the selected endpoints 109. Once sent, if the status request 113 is received by a respective endpoint 109, then the communication pathway 111 between the sending and receiving endpoints 109 is available. Once a status request 113 is received, the monitoring application 119 of the receiving endpoint 109 transmits an acknowledgment back to the sending endpoint 109. In this respect, the sending endpoint 109 is made aware of the fact that each of the nodes 106 in the respective communication pathway 111 between the respective sending and receiving endpoints 109 is available.

Since the respective communication pathway 111 is available, the sending endpoint 109 creates a status request result 129 in its status request results log 126 that indicates that the communication pathway 111 between the respective pair of endpoints 109 is available. For example, a respective communication pathway 111 may be indicated as available with a "1" or other indicator. The same may be indicated as unavailable or interrupted with a "0" or other indicator. In this way, each endpoint 109 may send status requests 113 to respective other endpoints 109 to determine the status of the communication pathway 111 therebetween.

In addition, when the monitoring application 119 in a given one of the endpoints 109 generates a status request 113 to send to another one of the endpoints 109, the monitoring application 119 is configured to include in the status request 113 a predefined number of previously stored status request results 129 from its respective status request results log 126. In a receiving endpoint 109, a monitoring application 119 is configured to both acknowledge receipt of status requests 113 from other endpoints 109, and add all of the status request results 129 included in a received status request 113 to its own status request results log 126 provided that such status request results 129 are not duplicative of any previously stored status request results 129. Also, the receiving endpoint 109 may include a number of the status request results 129 from its status request results log 126 in the acknowledgement that are accessed by the sending endpoint 109 and placed in its status request results log 126 provided such status request results 129 are not duplicative.

In this manner, each of the endpoints 109 shares the status request results 129 in their status request results log 126 with other ones of the endpoints 109. As a consequence, a greater amount of status request results 129 that provide an indication as to the availability of respective communication pathways 111 may be circulated among all of the endpoints 109 on the network 103 using a lesser number of status requests 113. If the additional status request results 129 were not included in each of the status requests 113 as such, then each endpoint 109 would have to generate and send status requests 113 to all other endpoints 109 on a more frequent basis in order to obtain an adequate indication of the status of all of the nodes 106 on the network 103. This would result in a greater number of status requests 113 being generated and transmitted on the network 103, which translates into potentially unnecessary usage of network resources.

The monitoring application 119 executed in each of the endpoints 109 is further configured to derive the operational status of each of the nodes 106 based upon the status request results 129 from the respective status requests 113 transmitted between the respective pairs of endpoints 109. To this end, each status request result 129 indicates the sending and receiving endpoints 109 involved in the transmission of the respective status request 113. Also, associated with each of the communication pathways 111 in the communication pathway table 123 is a sequence of nodes 106 through which status requests 113 will pass during transmission between respective sending and receiving endpoints 109.

The monitoring application 119 is configured to look up the respective nodes 106 associated with a communication pathway 111 for each of the status request results 129. Once the nodes 106 are known, the monitoring application 119 associates a node status value 136 with each respective node 106 in the given communication pathway 111. The node status value 136 indicates whether the respective status request 113 was successfully communicated between the endpoints 109 as indicated in the status request results 129 associated with the status request 113.

For example, assuming that a status request result 129 indicates that the respective communication pathway 111 was available, then node status values 136 are associated with each of the respective nodes 106 that make up the respective communication pathway 111 indicating operational status. This is assumed since the status request 113 successfully passed through all of the nodes 106 in the respective communication pathway 111.

On the other hand, if a respective communication pathway 111 is unavailable, then a node status value 136 may be associated with each of the respective nodes 106 in such communication pathway 111 that indicates a lack of availability. In one embodiment, the node status value 136 that indicates availability is "1," and a node status value 136 that indicates a lack of availability is a "−1." Alternatively, other node status values 136 or designators may be used. Accordingly, for each new status request result 129 received or generated in a given endpoint 109, the resident monitoring application 119 proceeds to generate node status values 136 for respective nodes 106 that lie in the communication pathways 111 associated with such status request result 129.

The monitoring application 119 is further configured to calculate a node status score 133 for each of the nodes 106 from the node status values 136 associated with each respective one of the nodes 106. To this end, each node status score 133 may be calculated as a running average of a predefined number of the node status values 136. The running average may be calculated as a function of a predefined number of the most recently generated node status values 136. Alternatively, the running average may comprise a weighted average that employs a linear function or decaying exponential function so that most recently generated node status values 136 exert a greater impact or influence over the node status score 133. In one embodiment, the node status values 136 for each node 106 may be stored in a first-in-first-out queue so as to keep only a predefined number of node status values 136 at any given time to allow the respective node status score 133 calculated therefrom to change over time with changes in the operation of a given node 106.

It should be noted that if a given status request 113 is not successfully communicated between first and second endpoints 109, it is likely to be the case that the failure is centered at a single node 106 among those that make up the respective communication pathway 111. Even though the failure is typically localized to a single node 106, the monitoring application 119 still assigns node status values 136 that reflect negatively on all of the nodes 106 associated with the corresponding communication pathway 111. However, it should be noted that in the network 103, multiple communication pathways 111 intersect at one or more nodes 106. It follows that node status values 136 are assigned to individual nodes 106 from the status request results 129 from multiple communication pathways 111. As a consequence, if a given node 106 is operational, ultimately positive node status values 136 feedback should outweigh negative node status values 136 feedback and vice versa. In this manner, the operational status of each of the nodes 106 may be derived from the respective status requests 113 transmitted between respective pairs of the endpoints 109.

By repeatedly calculating the node status scores 133 for each of the nodes 106 over time, the monitoring application 119 thus maintains an indication of the operational status or health of each of the nodes 106. Given that the node status scores 133 are calculated based on the node status values 136 that are, in turn, generated based on the success or failure of transmission of the status requests 113 between pairs of endpoints 109, the node status scores 133 are advantageously derived from the status requests 113 without requiring actual knowledge of the operational status of each node 106 in the network 103. The node status scores 133 maintained for each of the nodes in the network 103 indicates a degree to which respective nodes 106 are experiencing a malfunction relative to the other ones of the nodes 106. That is to say that a node status score 133 may indicate a problem with a node 106, for example, if the node status score 133 is much lower than the other node status scores 133.

According to various embodiments, various actions may be taken in response to the node status scores 133. For example, where a node status score 133 indicates that a problem exists for a respective node 106, then one action that may be taken is to shut down the node 106 to prevent the loss of data. In one embodiment, the shutting down of a node 106 may cause data communication to divert around the shut down node 106. Alternatively, where the operational health of a node 106 appears to be deteriorating due to a negative trend in the node status score 133 associated with such node 106, a network operator may take preventative action by trouble shooting such node 106 to identify a problem and employ a proper fix or replace any components as can be appreciated.

Figure 2:
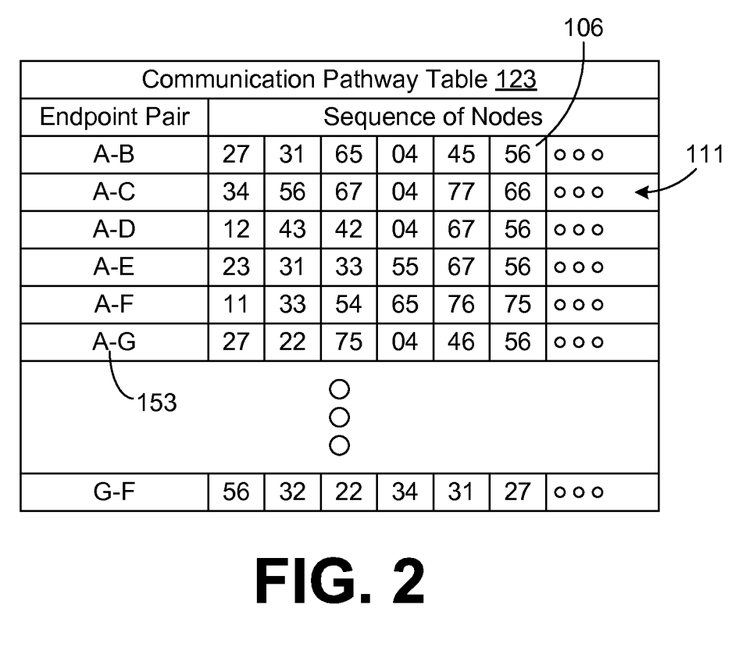
FIG. 2 is a drawing that illustrates an example of a listing of a plurality of communication pathways through a network in the networked environment of FIG. 1 according to an embodiment of the present disclosure.

Referring next to FIG. 2, shown is one example of the communication pathway table 123 stored in the data store 116 (FIG. 1) that includes the listing of the communication pathways 111. Alternatively, the communication pathway table 123 may be stored in a central device coupled to the network 103, where such communication pathway table 123 is accessible to each of the endpoints 109. To this end, the communication pathways 111 may be stored in any one of a number of different data structures such as, for example, a mapping such as a hash map, a table, a tree, or other type of storage. Alternatively, the communication pathways 111 may be derived from a graph of the network 103 that shows each of the nodes 106, or the communication pathways 111 may be derived from some other representation of the network 103 or the nodes 106. Each communication pathway 111 is expressed in terms of a corresponding endpoint pair 153 and a sequence of nodes 106. The communication pathway table 123 is stored in the data store 116 so that the monitoring application 119 (FIG. 1) may be made aware of those nodes 106 that are employed for the communication pathway 111 between a respective endpoint pair 153. This allows the monitoring application 119 to assign node status values 136 (FIG. 1) to respective nodes 106 involved in the communication of a status request 113 (FIG. 1) between a respective endpoint pair 153 as mentioned above.

Figure 3:
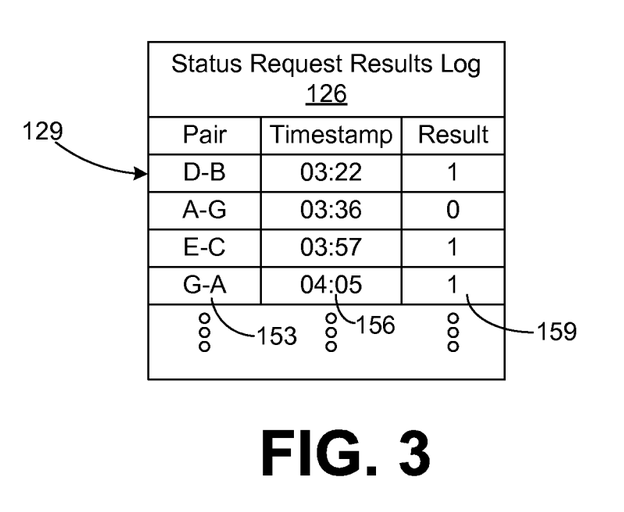
FIG. 3 is a drawing that illustrates an example of a status request results log maintained in an endpoint device in the networked environment of FIG. 1 according to an embodiment of the present disclosure.

Referring next to FIG. 3, shown is one example of a status request results log 126 that lists a number of status request results 129. Each status request result 129 is expressed in terms of an endpoint pair 153, a time stamp 156, and a value 159 that indicates the results of the corresponding status request 113 (FIG. 1). For example, if a status request 113 was successfully received by a receiving endpoint 109 (FIG. 1), then the communication pathway 111 (FIG. 1) between the respective sending and receiving endpoints 109 is available. Accordingly, a value 159 of "1" may be placed in the status request results log 126 in association with the respective status request result 129. Alternatively, if the respective communication pathway 111 was unavailable, then a value 159 of "0" may be written to the status request results log 126 in association with the respective status request result 129. Alternatively, other values 159 may be used to represent the different results of a status request 113. Ultimately, the status request results 129 listed may be consulted to generate the node status values 136 (FIG. 1) that are assigned to respective nodes 106 (FIG. 1) as mentioned above.

Figure 4:
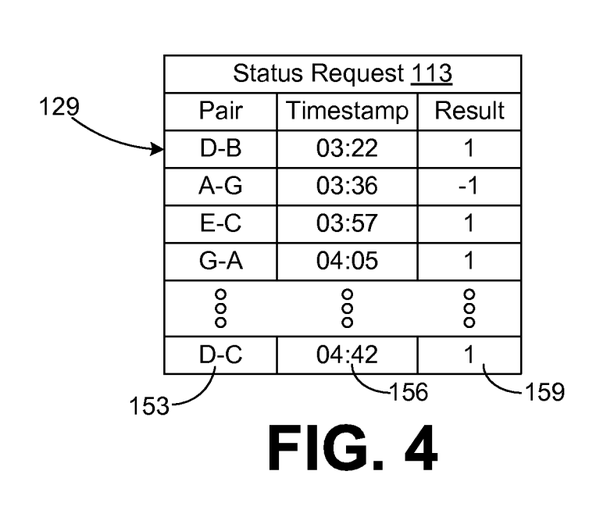
FIG. 4 is a drawing that illustrates an example of a status request sent between a pair of endpoints in the networked environment of FIG. 1 according to an embodiment of the present disclosure.

With reference next to FIG. 4, shown is one example of a portion of a status request 113 that shows a plurality of status request results 129 that are included in a given status request 113. In addition, other information may be included in the status request 113 so that a receiving endpoint 109 (FIG. 1) will recognize the status request 113 and send an acknowledgement back to the sending one of the endpoints 109.

The status request 113 includes a listing of a number of the status request results 129 taken from the status request results log 126 (FIG. 1) of the sending endpoint 109 as described above. To this end, each of the status request results 129 includes an endpoint pair 153, a timestamp 156, and the value 159 indicating the result of the corresponding status request 113. The number of status request results 129 that are included in a respective status request 113 may be predetermined for all of the endpoints 109, or may be uniquely determined for each individual endpoint 109.

Figure 5:
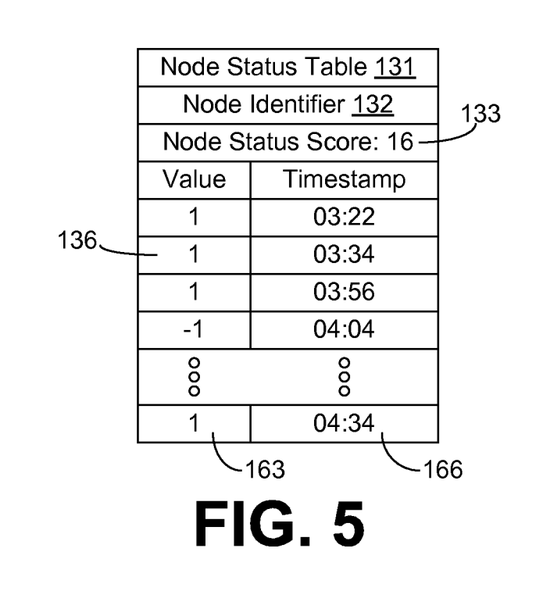
FIG. 5 is a drawing that illustrates an example of data stored in association with a node in a network in the networked environment of FIG. 1 according to an embodiment of the present disclosure.

With reference to FIG. 5, shown is one example of a node status table 131 that includes the data stored in association with a node 106 (FIG. 1) in the data store 116 (FIG. 1) as described above. Specifically, the node status table 131 includes the node identifier 132, the node status score 133, and the node status values 136.

The node status score 133 may be calculated periodically according to a schedule or at other times. For example, the node status score 133 may be calculated when a predefined number of new node status values 136 have been added to the node status table 131 for a given node 106, or other criteria may be employed. Each node status value 136 is expressed in terms of the value 163 and a time stamp 166. The values 163 are derived from the respective values 159 (FIG. 4) associated with the respective status request results 129 (FIG. 1) as described above. In one embodiment, the values 163 may be equal to the same values 159 stored with respect to each status request result 129. Alternatively, the values 163 may be expressed in some other manner.

Given that a number of node status values 136 may be associated with a given node 106, then various approaches may be employed to calculate the node status score 133 for nodes 106 given the node status values 136 that exist at a given time. In one embodiment, node status values 136 may be stored only for a predefined period of time and may be considered obsolete after such time has passed. This ensures that the node status values 136 used to calculate the node status score 133 are most relevant given the current situation on the network 103 (FIG. 1). Various approaches may be employed to calculate the node status score 133 using the node status values 136. For example, a node status score 133 may be calculated as a simple sum of the node status values 136 that have been generated within a most recent predefined period of time. Alternatively, a predefined number of the most recent entered node status values 136 may be added.

In calculating the node status score 133 from the node status values 136, it may be the case that the node status values 136 are weighted based upon the time stamp 166. For example, various functions such as a decaying exponential function or linear function may be employed to weight the node status values 136 over time when added or otherwise used to calculate the node status score 133.

Figure 6:
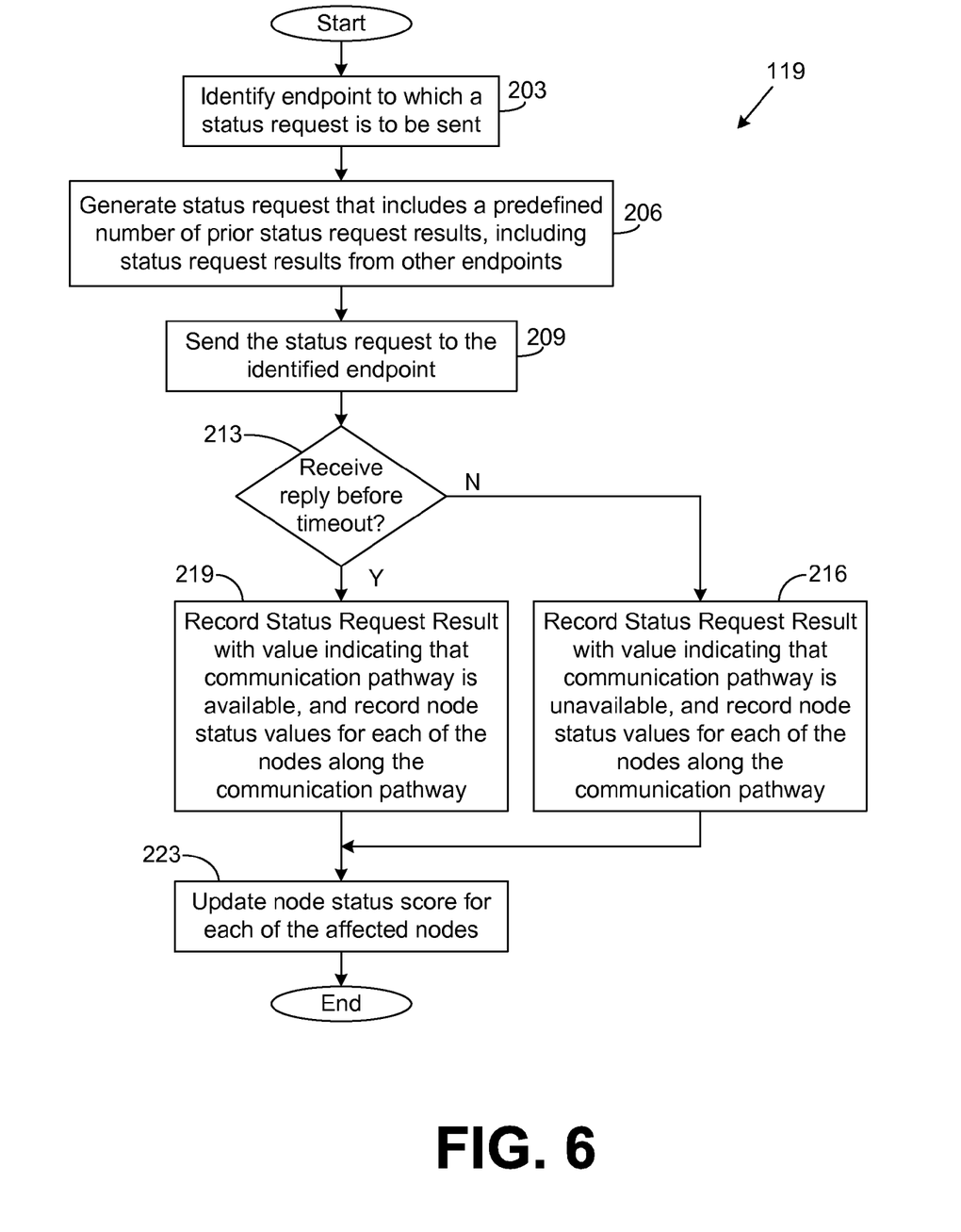
FIG. 6 is a flowchart that illustrates an example of a portion of the operation of a monitoring application implemented in each of the endpoints in the networked environment of FIG. 1 according to an embodiment of the present disclosure.

Referring next to FIG. 6, shown is a flowchart that provides one example of a portion of the operation of the monitoring application 119 in generating and transmitting a status request 113 (FIG. 1) and taking action based on whether the status request 113 was received by the receiving endpoint 109 (FIG. 1) according to an embodiment of the present disclosure. Alternatively, the flowchart of FIG. 6 may be viewed as depicting steps of an example of a method implemented in an endpoint 109 according to an embodiment of the present disclosure.

To begin, in box 203, the monitoring application 119 identifies a respective one of the endpoints 109 to which the status request 113 is to be sent. To do so, the monitoring application 119 may consult the endpoint table 121 (FIG. 1). The receiving endpoint 109 may be selected at random, in round robin fashion, or based on some other approach. Thereafter, in box 206, the status request 113 is generated that includes a predefined number of prior status request results 129 (FIG. 1) stored in the status request results log 126 (FIG. 1). The number of the status request results 129 that are included or embedded in the status request 113 is predefined. In one embodiment, the number of status request results 129 included in a given status request 113 may include all status requests results 129 that were newly received since the last status request 113 was sent to the currently selected endpoint 109.

It should be noted that the number of status request results 129 included in a given status request 113 involves a trade-off between the size of the status request 113 to be communicated through the network 103 (FIG. 1) and the amount of network bandwidth that is to be used for the function of communicating the status request 113. That is to say, longer status requests 113 will require greater network bandwidth to communicate between endpoints 109 as can be appreciated. At the same time, if a greater number of status request results 129 are included in a status request 113, then status requests 113 do not need to be sent as often. Thus, the number of status request results 129 to include in a given status request 113 depends upon the size of the status requests 113, the frequency at which the status requests 113 are sent, the maximum size of packets allowed according to the communication protocol of the network 103 (i.e., the maximum transmission unit (MTU)), and/or the desired amount of network bandwidth that is available to communicate the status request 113.

Next, in box 209, the monitoring application 119 sends the status request 113 to the endpoint 109 identified in box 203 above. Thereafter, in box 213, the monitoring application 119 waits to receive a reply from the respective endpoint 109 in response to the status request 113. Assuming that no reply is received before a predefined timeout period has expired, then the monitoring application 119 proceeds to box 216. However, if a reply is received as determined before the expiration of the timeout period, then the monitoring application 119 proceeds to box 219.

In box 219, the monitoring application 119 records a status request result 129 in the status request results log 126. Also, the monitoring application 119 records respective node status values 136 (FIG. 1) in the node status tables 131 (FIG. 1) for all of the nodes 106 (FIG. 1) included in the communication pathway 111 traversed by the status request 113. To this end, the nodes 106 are identified in the communication pathway table 123 (FIG. 1). The node status values 136 recorded indicate that the respective nodes 106 are operational as the status request 113 was successfully communicated to the receiving endpoint 109.

Next, in box 223 the monitoring application 119 updates the node status score 133 (FIG. 1) associated with each of the affected nodes 106 making up the communication pathway 111 between respective endpoints 109 as described above. Thereafter, this portion of the monitoring application 119 ends as shown.

Referring back to box 213, as stated above, if no reply is received within the timeout period, then the monitoring application 119 proceeds to box 216. The timeout period may be predefined depending upon how long it is deemed that the monitoring application 119 should wait before it assumes that a status request 113 was lost. Thus, if the monitoring application 119 proceeds to box 216, then it is assumed that the status request 113 did not make it to the receiving endpoint 109.

In box 216, a respective status request result 129 is generated and stored in the status request results log 126 indicating that the status request 113 was unsuccessful. Also, corresponding node status values 136 are associated with each of the nodes 106 reflecting the fact that the respective communication pathway 111 was not available. Thereafter, the monitoring application 119 proceeds to box 223 to update the node status scores 133 for each of the affected nodes 106 as described above. Thereafter, this portion of the monitoring application 119 ends as shown.

Figure 7:
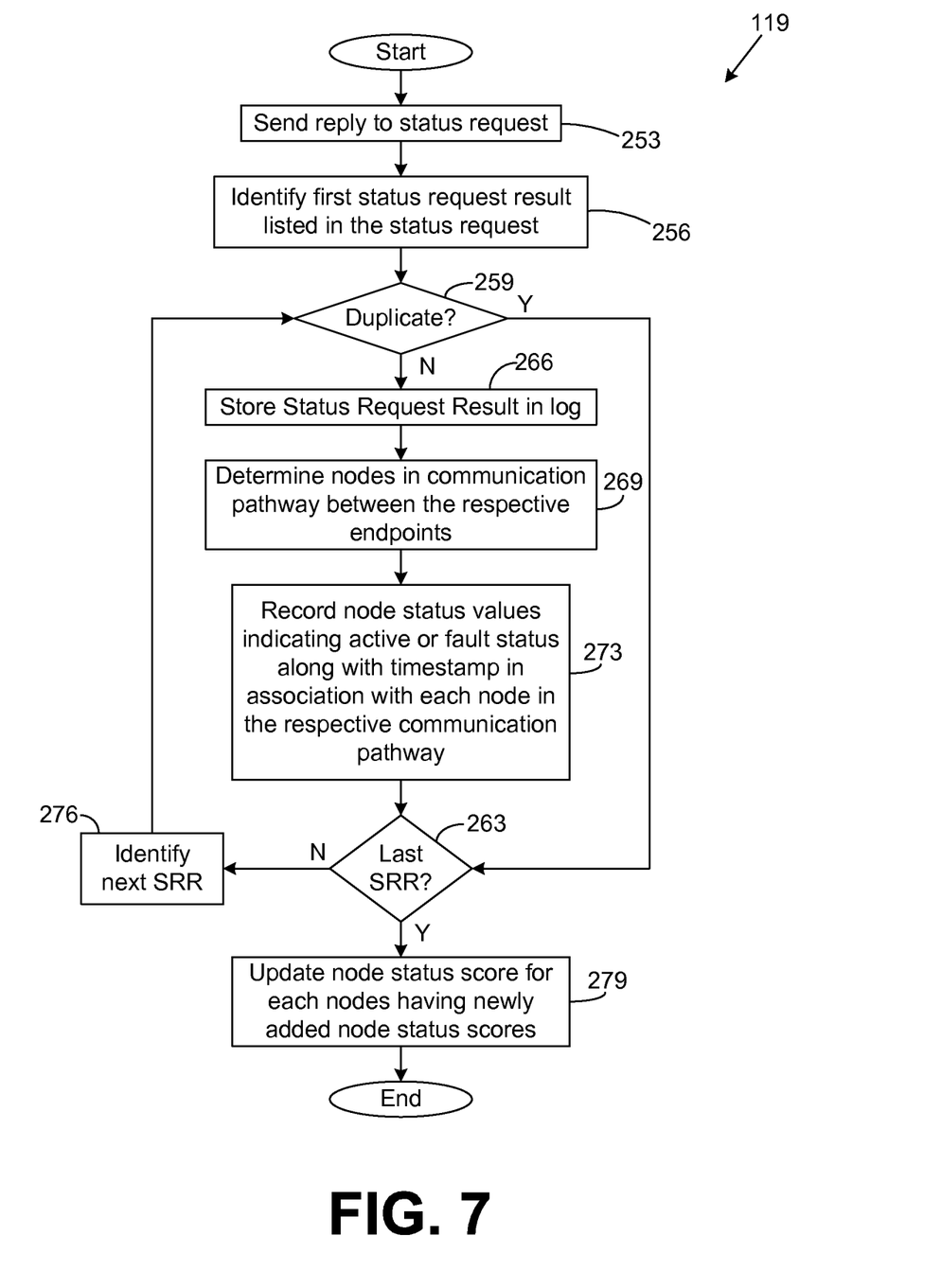
FIG. 7 is a flowchart that illustrates an example of another portion of the operation of a monitoring application implemented in each of the endpoints in the networked environment of FIG. 1 according to an embodiment of the present disclosure.

Referring next to FIG. 7, shown is a flowchart that provides another example of a portion of the operation of the monitoring application 119 processing a status request 113 (FIG. 1) received from a sending endpoint 109 (FIG. 1). Alternatively, the flowchart of FIG. 7 may be viewed as depicting steps of an example of a method implemented in an endpoint 109 according to an embodiment of the present disclosure.

Beginning with box 253, the monitoring application 119 sends a reply or acknowledgement to the status request 113 received from a sending endpoint 109, thereby informing the sending endpoint 109 that the status request 113 was successfully received. In one embodiment, the monitoring application 119 may include a plurality of status request results 129 (FIG. 1) in the acknowledgement to be processed by the sending endpoint 109. Thereafter, in box 256, a first status request result 129 (FIG. 1) is identified in the status request 113 for consideration. Then in box 259, the monitoring application 119 checks to see if the current status request result 129 being considered is duplicative of any of the status request results 129 currently stored in the status request results log 126 (FIG. 1) of the receiving endpoint 109. If so, then the monitoring application 119 proceeds to box 263. Otherwise, the monitoring application 119 progresses to box 266.

In box 266, the status request result 129 is stored in the status request results log 126 of the receiving endpoint 109. Thereafter, in box 269, all nodes 106 (FIG. 1) are identified in the respective communication pathway 111 (FIG. 1) associated with the current status request result 129 by consulting the communication pathway table 123 (FIG. 1). Thereafter, in box 273, nodes status values 136 (FIG. 1) are recorded in association with the nodes 106 indicating the status of the communication pathway 111. Such node status values 136 reflect whether the nodes 106 are part of an unavailable or interrupted communication pathway 111.

Thereafter, the monitoring application 119 progresses to box 263 to determine whether the last status request result 129 included in the current status request 113 has been processed.

If not, then in box 276, the monitoring application 119 proceeds to identify the next status request result 129 to process. Thereafter, the monitoring application 119 reverts back to box 259 as shown.

However, if the last status request results 129 has been processed as determined in box 263, then the monitoring application 119 progresses to box 279 to update the node status scores 133 (FIG. 1) for each of the nodes 106 for which newly added node status scores 133 where associated in box 273. Thereafter, the monitoring application 119 ends. Note that if an acknowledgement includes a plurality of status request results 129 as mentioned above, then the sending endpoint 109 may process the status request results 129 in much the same manner as those that are included in a status request 113 as described above.

Figure 8:
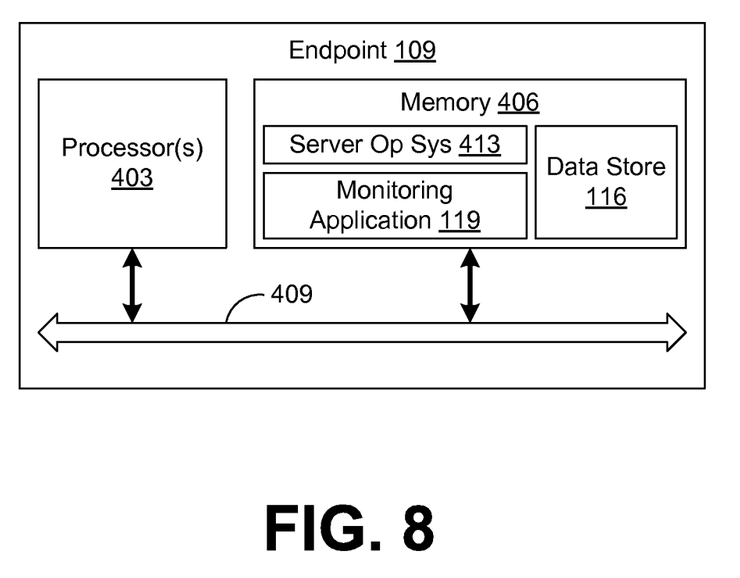
FIG. 8 is a schematic block diagram that illustrates an example of an endpoint in the networked environment of FIG. 1 according to an embodiment of the present disclosure.

Referring next to FIG. 8, shown is a schematic block diagram of one example of an endpoint 109 according to an embodiment of the present disclosure. The endpoint 109 includes at least one processor circuit, for example, having a processor 403 and a memory 406, both of which are coupled to a local interface 409. The processor 403 is a solid state device that includes millions of switching elements such as transistors and other elements. The endpoint 109 may comprise, for example, a computer system such as a server computer system, personal computer system, or device with like capability as described above. The local interface 409 may comprise, for example, a data bus with an accompanying address/control bus or other bus structure as can be appreciated.

Stored in the memory 406 are both executable applications and/or systems executed by the processor 403 and data. In particular, stored in the memory 406 and executable by the processor 403 are a server operating system 413, the monitoring application 119, and potentially other applications and/or systems, etc. Also, stored in the memory 406 is the data store 116 in which are stored the various data items described above so as to be accessible to the processor 403. It is understood that other data may be stored in the memory 406 and accessed by the processors 403 beyond the data described above.

A number of software components are stored in the memory 406 and are executable or executed by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 403 may represent multiple processors and the memory 406 may represent multiple memories that operate in parallel. In such a case, the local interface 409 may be an appropriate network that facilitates communication between any two of the multiple processors, between any processor and any one of the memories, or between any two of the memories etc. The local interface 409 may comprise additional systems designed to coordinate this communication, including, for example, performing load balancing. The processor 403 may be of electrical or of some other available construction.

The various systems, applications, or other components described above may be implemented using any one or more of a number of programming languages such as, for example, C, C++, C#, Visual Basic, VBScript, Java, JavaScript, Perl, Ruby, Python, Flash, or other programming languages.

Although the various applications and other components such as, for example, the monitoring application 119 and any other components described above may be embodied in software or code executed by general purpose hardware, as an alternative the same may also be embodied in dedicated hardware or a combination of software/general purpose hardware and dedicated hardware. If embodied in dedicated hardware, the monitoring application 119 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6-7 show the functionality and operation of an implementation of the various applications and/or other components such as, for example, the monitoring application 119 as described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 6-7 show a specific order of execution, it is understood that the order of execution may differ from that which is depicted. For example, the order of execution of two or more blocks may be scrambled relative to the order shown. Also, two or more blocks shown in succession in FIGS. 6-7 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications, systems, and/or other components described herein such as, for example, the monitoring application 119 comprise software or code, each can be embodied in any computer-readable medium for use by or in connection with an instruction execution system such as, for example, a processor in a computer system or other system. In this sense, the applications or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, semiconductor, or other media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a monitoring application executable in at least one computing device, comprising:

code that maintains a listing of components of a network in a memory in communication with the at least one computing device, wherein the listing of components comprises at least a plurality of endpoints and a plurality of nodes, the plurality of endpoints comprising processing circuitry;

code that generates a status request to send to one of the plurality of endpoints initiated by the at least one computing device to test a plurality of communication pathways between the one of the plurality of endpoints and at least a portion of the plurality of endpoints, wherein the status request comprises at least a predefined number of previously determined status request results, the plurality of communication pathways comprising a fixed sequence of the plurality of nodes in the network; and code that determines a status score for individual ones of the plurality of endpoints indicating an operability of a respective one of the plurality of endpoints, wherein the status score for the individual ones of the plurality of endpoints is determined as a function of a plurality of previously determined status values stored in association with the respective one of the plurality of endpoints, wherein a first one of the previously determined status values generated more recent than a second one of the previously determined status value has a greater degree of influence on the status score.

2. The non-transitory computer-readable medium of claim 1, wherein individual ones of the previously determined status request results comprise an indication of a pair of the plurality of endpoints, a timestamp, and a transmission indication indicative as to whether the status request was successfully transmitted between the pair of the plurality of endpoints.

3. A system, comprising:
   at least one computing device in communication with a memory; and
   a node monitoring application executed in the at least one computing device, the node monitoring application comprising:
      logic that generates a status request to send to one of a plurality of endpoints to test a communication pathway between the one of the plurality of endpoints and at least a portion of the plurality of endpoints in a network, wherein the status request comprises at least a predefined number of previously determined status request results; and
      logic that determines a status score for individual ones of the plurality of endpoints indicating an operability of a respective one of the plurality of endpoints utilizing at least the status request, wherein the status score for the individual ones of the plurality of endpoints is determined as a function of a plurality of previously determined status values, wherein a first one of the previously determined status values generated more recent than a second one of the previously determined status value has a greater degree of influence on the status score.

4. The system of claim 3, wherein the node monitoring application further comprises logic that stores a result from the status request in a status request results log in at least one of the plurality of endpoints.

5. The system of claim 3, wherein the communication pathway further comprises a predefined sequence of a plurality of nodes in the network.

6. The system of claim 3, wherein the portion of the plurality of endpoints is randomly selected.

7. The system of claim 3, wherein the status score for the individual ones of the plurality of endpoints is determined from an average of a plurality of status values stored in association with the respective one of the plurality of endpoints.

8. The system of claim 3, wherein the node monitoring application further comprises:
   logic that identifies individual ones of a plurality of nodes in the network associated with the communication pathway between a pair of the plurality of endpoints indicated in a respective one of the previously determined status request results; and
   logic that associates a status value with the individual ones of the plurality of nodes associated with the communication pathway, the status value indicating whether the status request was transmitted successfully along the communication pathway.

9. The system of claim 3, wherein the status score further comprises a positive value when the communication pathway between the one of the plurality of endpoints and a respective one of the portion of the plurality of endpoints is available.

10. The system of claim 3, wherein the status score further comprises a negative value when the communication pathway between the one of the plurality of endpoints and a respective one of the portion of the plurality of endpoints is unavailable.

11. A method, comprising:
   generating, by a first one of a plurality of endpoints in a network, a status request to send to a second one of the plurality of endpoints, wherein the status request determines a status for a communication pathway between the first one of the plurality of endpoints and the second one of the plurality of endpoints;
   including a result from a prior status request in the status request, the result describing an availability of the communication pathway between a respective pair of the plurality of endpoints;
   sending the status request from the first one of the plurality of endpoints to the second one of the plurality of endpoints; and
   maintaining a node status score in memory for individual ones of a plurality of nodes in the communication pathway, wherein the node status score indicates an operability of a respective one of the plurality of nodes relative to other ones of the plurality of nodes, wherein the node status score for the individual ones of the plurality of endpoints is determined as a running average of a predefined number of a plurality of previously determined status values, wherein a first one of the previously determined status values generated more recent than a second one of the previously determined status value has a greater degree of influence on the node status score.

12. The method of claim 11, wherein the result from the prior status request is accessed from a status request results log stored in the first one of the plurality of endpoints.

13. The method of claim 11, further comprising calculating the node status score as a function utilizing at least the result of the prior status request and a subsequent result of the status request.

14. The method of claim 11, wherein the communication pathway comprises a fixed sequence of the plurality of nodes in the network.

15. The method of claim 11, wherein the second one of the plurality of endpoints is randomly selected.

16. The method of claim 11, wherein the node status score further comprises a positive value when the communication pathway between a corresponding pair of the plurality of endpoints is available.

17. The method of claim 11, wherein the node status score further comprises a negative value when the communication pathway between a corresponding pair of the plurality of endpoints is unavailable.

18. The non-transitory computer-readable medium of claim 1, wherein the function is a linear function calculated as a weighted average of the plurality of previously determined status values.

19. The system of claim 3, wherein the function is a decaying exponential function calculated as a weighted average of the plurality of previously determined status values.

20. The method of claim 11, wherein the running average is a weighted average of the plurality of previously determined status values that employs a linear function or a decaying exponential function.

* * * * *